United States Patent [19]
Kim

[11] Patent Number: 5,535,245
[45] Date of Patent: Jul. 9, 1996

[54] MODULATION/DEMODULATION CIRCUIT FOR A DIGITAL SIGNAL RECORDER/REPRODUCER

[75] Inventor: Soon T. Kim, Kumi, Rep. of Korea

[73] Assignee: Samsung Electronics Co., Ltd., Kyungki-do, Rep. of Korea

[21] Appl. No.: 314,420

[22] Filed: Sep. 28, 1994

[30] Foreign Application Priority Data

Sep. 28, 1993 [KR] Rep. of Korea ............... 93-20333

[51] Int. Cl.$^6$ ............................... H04L 5/12
[52] U.S. Cl. ............... 345/261; 345/264; 345/324; 360/29; 329/304; 332/103; 358/323
[58] Field of Search ............... 375/261, 264, 375/298, 324, 340; 360/29, 77.14; 329/304; 332/103; 370/98; 358/323

[56] References Cited

U.S. PATENT DOCUMENTS

| | | | |
|---|---|---|---|
| 4,123,710 | 10/1978 | Stuart et al. | 375/264 |
| 4,355,397 | 10/1982 | Stuart | 375/264 |
| 4,945,549 | 7/1990 | Simon et al. | 375/280 |
| 4,979,052 | 12/1990 | Matsuta et al. | 360/32 |
| 5,062,007 | 10/1991 | Nakatsu et al. | 360/29 |
| 5,095,392 | 3/1992 | Shimazaki et al. | 360/40 |
| 5,402,242 | 3/1995 | Nakatsu et al. | 360/39 |

Primary Examiner—Stephen Chin
Assistant Examiner—T. Ghebretinsae
Attorney, Agent, or Firm—Sughrue, Mion, Zinn, Macpeak & Seas

[57] ABSTRACT

A modulation circuit for a digital signal recorder includes first and second high-pass filters for removing the direct current component in the output of the coded I and Q channels and for converting a 4-levels signal into a 7-levels signal. Additionally, a carrier signal generator for generating a carrier signal, a modulator for performing quadrature amplitude and phase modulations on the outputs of first and second high-pass filters using the carrier signal, a pilot signal generator for generating a pilot signal and combining the pilot signal with the output of modulator and for outputting the result for transmission or recording are also provided. A complimentary demodulation circuit includes a carrier restoring circuit for restoring the carrier signal using the pilot signal from the reproduced or received modulated digital signal which has been transferred or recorded, a demodulator for performing quadrature amplitude and phase demodulation on the modulated digital signal using the restored carrier signal to thereby output I and Q channel signals, first and second detectors for detecting the 7-levels digital signal from the output of the demodulator, third and fourth detectors for converting the 7-levels digital signal of the first and second detectors into 4-levels digital signal, and a fifth detector for decoding the outputs of third and fourth detectors to receive the source signal. It will be appreciated that this circuit enhances the accuracy in restoring the carrier and improves the power efficiency.

15 Claims, 14 Drawing Sheets

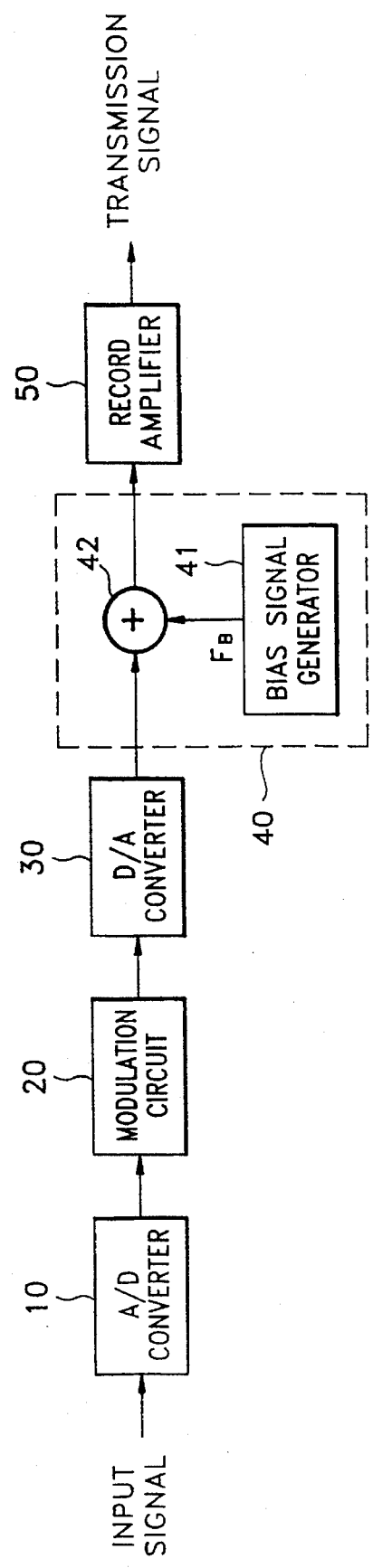
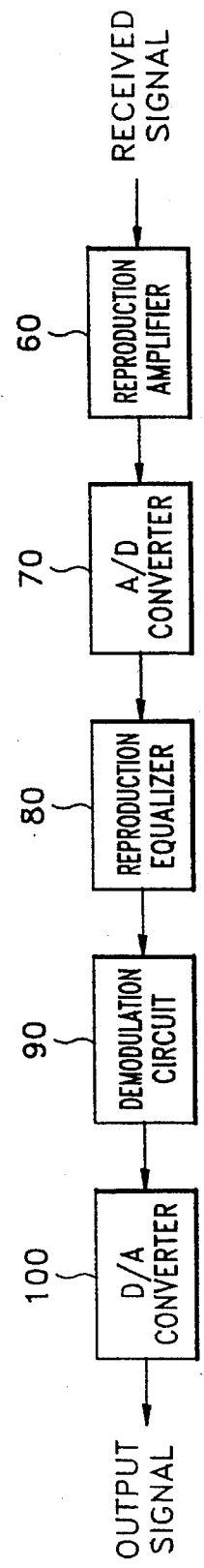

FIG. 19

| INPUT\DELAY | X1 | X3 | X5 | X7 |
|---|---|---|---|---|
| X1 | X4 | X3 | X2 | X1 |
| X3 | X5 | X4 | X3 | X2 |
| X5 | X6 | X5 | X4 | X3 |
| X7 | X7 | X6 | X5 | X4 |

MODULATION/DEMODULATION CIRCUIT FOR A DIGITAL SIGNAL RECORDER/REPRODUCER

BACKGROUND OF THE INVENTION

1. Field of the Invention

The present invention relates to a modulation/demodulation circuit for a digital signal recorder/reproducer, and more particularly, to a modulation/demodulation circuit for enhancing the accuracy of restoring a carrier signal, in an apparatus for recording/reproducing with inserting a pilot signal in order to restore the carrier signal.

The instant application is based on Korean Patent Application No. 93-20333, which is incorporated herein by reference for all purposes.

2. Brief Discussion of Related Art

As modern technology undergoes a gradual transformation from analog to digital processing techniques, various kinds of digital recording and reproducing methods are being proposed for various applications. One such application is a digital signal magnetic recorder/reproducer.

Although the digital signal magnetic recorder/reproducer, which records and reproduces a digital image signal, is excellent in terms of picture quality and dubbing performance in comparison with an analog signal magnetic recorder/reproducer, which records and reproduces an analog image signal, the quantity of data which must be recorded on the tape may be over ten times as large as that of a comparable analog signal magnetic recorder/reproducer used in recording the same image signal.

In a conventional record modulation method used for the digital signal magnetic recorder/reproducer, base-band frequency modulation methods such as non-return-to-zero-inverse (NRZI) modulation, partial response (PR) modulation, eight-to-fourteen modulation (EFM), etc., have been employed due to the difficulty in recording and reproducing direct current components. Such base-band frequency modulation methods are performed by converting the zero-run length of the data stream expressed in binary codes, concentrating a frequency spectrum of the signal in the mid-band, and then recording the signal having the concentrated frequency to thereby attain a high-density recording. However, in the base-band frequency modulation method, the signal level to be recorded has only two potential values, i.e., logic "high" and logic "low", which makes high-density recording difficult because of low frequency band utilization efficiency.

Therefore, a channel coding technology suitable for high-density recording is required. A modulation method, which has been used in the communication field, is changed and applied in a form suitable for recording and reproducing, thereby increasing the frequency bands utilization efficiency and improving the recording bit rate without increasing the number of recording channels, is required.

Accordingly, in order to realize a high-density recording, multi-level digital modulation methods such as quadrature amplitude modulation (QAM), quadrature phase shift keying (QPSK), etc., which are known from other communication fields, have been introduced. As a result, the increase in utilization efficiency of frequency bands permits high-density recording.

FIG. 1 shows a modulation system in a common digital signal recorder/reproducer, wherein an input signal is converted into a digital signal in A/D converter 10 and is quadrature amplitude and phase modulated in QAM modulation circuit 20 before being converted back into an analog signal in D/A converter 30.

The frequency of a bias signal $F_B$ generated by bias signal generator 41 and the maximum frequency $f_H$ of the recording signal band are recorded onto a magnetic recording medium such that the following relation is true.

$$F_B \geq 3f_H \ldots \quad (1)$$

In adder 42, the quadrature amplitude modulated signal, which is output by D/A converter 30, is added to bias signal $F_B$. Then, the output from adder 42 is recorded onto the magnetic recording medium as a magnetizing signal via record amplifier 50. The bias signal $F_B$ is used for correcting a hysteresis characteristic of the magnetizing signal.

FIG. 2 shows the demodulation system in a common digital signal recorder/reproducer. It will be appreciated that the demodulation process is, essentially the reverse of the modulation process.

Referring to FIG. 2, the modulated signal recorded onto magnetic recording media is reproduced and amplified by a reproduction amplifier 60, is then converted into digital signal in an A/D converter 70, and is applied to a reproduction equalizer 80. In reproduction equalizer 80, signal distortion and the diminished characteristics of the signal which can occur during transmission are corrected. Thereafter, in QAM demodulation circuit 90, the modulated signal output from reproduction equalizer 80 is demodulated and restored to the original digitized signal. Then, the restored signal is converted back into an analog signal in a D/A converter 100 for output.

FIG. 3 is a circuit diagram of the QAM modulation circuit 20 shown in FIG. 1, which includes a mapper 21, wherein the partial bits which are coded and the remaining bits which are not coded, which are output from A/D converter 10, are input together. Then, the input data bits are simultaneously processed in parallel to the degree required to generate a predetermined number of bits so that the coding gain is made large when a decoding operation is subsequently performed, separated into I and Q channel data, and output.

First and second raised cosine filters (RCF) 22 and 26 perform band limiting and waveform shaping in order to remove any inter-symbol interference (ISI).

In a phase-locked loop (PLL) circuit 24, a carrier signal is generated and input to a first balanced modulator 23 directly and to a second balanced modulator 27 via a phase shifter 25, which shifts the output of PLL 24 by 90 degrees. Accordingly, a first carrier signal input to first balanced modulator 23 has a sine component while a second carrier signal input to second balanced modulator 27 has a cosine component.

Then, in first balanced modulator 23, I-channel data from first RCF 22 and the first carrier signal (sine) are multiplied and balance-modulated, while in second balanced modulator 27, Q-channel data from second RCF 26 and the second carrier signal (cosine) are multiplied and balance-modulated. The balance-modulated I- and Q-channel signals are combined in adder 28 and the combined signal is then output.

As shown in FIG. 4, which illustrates the spectral characteristics of the output of the QAM modulation circuit of FIG. 3, the symmetrical upper and lower sidebands of a carrier frequency $f_c$ are produced at the output of adder 28. It will be noted that the carrier signal component has been removed in the $f_c$ band.

FIG. 5 shows the frequency characteristics of first and second raised cosine filters 22, 26 of FIG. 3. Each raised cosine filter consists of a low-pass filter for waveform shaping and band limiting, resulting in a low-pass Nyquist filter characteristic.

On the other hand, when 16 QAM modulation is adapted in the modulation circuit shown in FIG. 3, and a carrier restoring circuit of FIG. 6 is adapted in QAM demodulation circuit 90 shown in FIG. 2 and used to recover a carrier signal, a multiplier 91 requires sixteen squares as compared with common QAM modulation. This is extremely difficult in practice, however, and even if it can be realized, the circuit cost becomes excessive. Even when the carrier signal may be restored by realizing the carrier restoring circuit shown theoretically in FIG. 6, the real time operation is impossible when $f_c$ or an actual frequency of the base-band is high.

To overcome the above problems in FIG. 3, another form of QAM modulation circuit of FIG. 7 is shown, wherein pilot signal generator 129 and adder 130 are connected to the end of adder 128, to thereby transmit the pilot signal together with the modulated signal to a transmission path. While the modulation circuit has poor power efficiency as compared with the modulation circuit shown in FIG. 3, the carrier signal can be easily restored by real time operation when a complementary carrier restoring circuit of the demodulation circuit is used, as shown in FIG. 10.

As shown in FIG. 7, when the pilot signal having the frequency higher than the doubled frequency of the carrier signal is generated by pilot signal generator 129 and inserted in the output signal of adder 128, the amplitude characteristic is poor at the frequency of the upper side-band if the bandwidth is narrower than the signal band transmitted by the channel, although no problems are encountered when the bandwidth is wide enough. As a result, the signal to noise ratio (S/N ratio) is poor. In addition, jitter occurs more often than in case where the carrier signal alone is used. Therefore, restoration of the carrier signal by the receiver is difficult.

FIG. 8 shows a frequency spectrum of the output of the QAM modulation circuit shown in FIG. 7 when a pilot frequency $f_p$ is equal to $2f_c$. It will be noted that when pilot frequency $f_p$ is $2f_c$, the following two problems occur.

First, as shown in FIG. 8, since pilot frequency $f_p$ is on the uppermost portion of the upper sideband, the amplitude characteristic, i.e., the S/N ratio, is poor and the pilot signal can be easily interfered with by the adjacent channels.

Second, when the QAM modulation circuit is used for a video tape recorder, jitter occurs much more in pilot frequency $f_p$ than in the low frequency band. As a result, it is difficult to perfectly restore the carrier signal.

FIG. 9 shows the frequency spectrum of the output of the QAM modulation circuit shown in FIG. 7, when pilot frequency $f_p$ is equal to $f_c$.

When pilot frequency $f_p$ is $f_c$, the effects of the interference by the adjacent channels and the upper sideband are enhanced. It will be appreciated from the spectrum that the S/N ratio is still not enhanced.

FIG. 10 shows another form of carrier restoring circuit used for the QAM demodulation circuit 90 of FIG. 2, which forms a circuit for restoring the carrier signal from the QAM signal modulated by the QAM modulation circuit shown in FIG. 7. In band-pass filter 191, the band loaded with the pilot signal from the received signal is filtered and the clock signal having the frequency corresponding to carrier signal is restored by PLL 192.

However, in the QAM modulation circuit and the carrier restoring circuit shown in FIGS. 7 and 10, respectively, a bandpass filter (BPF) having a narrow bandwidth has to be used in order to restore only the carrier signal from a frequency band, for implementing a method for transmitting the original signal added with the carrier signal at the carrier location. Also, even if it is possible, restoring the carrier signal is very difficult due to the unnecessary noise (originally, this is signal information which is regarded as noise from the perspective of the carrier signal) of the peripheral portion.

When the QAM modulation circuit shown in FIG. 11 is used in order to solve the above problem, the difference is that burst signal insertion circuits 222 and 227 are used in front of first and second RCFs 223 and 228 in FIG. 11, as compared with the modulation circuit shown in FIG. 3.

FIG. 12 is a waveform diagram of time axis of the output of QAM modulation circuit shown in FIG. 11, while FIG. 13 is a graph showing the output frequency spectrum of QAM modulation circuit.

A method for adding a burst signal and restoring a carrier signal in the modulation circuit shown in FIG. 11, has several problems. First, the space for the information is reduced since the transmission efficiency of the information is poor. Second, the accuracy of restoring a carrier signal is deteriorated since jitter of the carrier signal does not correspond to that of the information throughout the signal sections.

SUMMARY OF THE INVENTION

The principal object of the present invention is to provide a modulation/demodulation circuit for a digital signal recorder/reproducer such as a digital recorder or a digital transmitter, which enhances the accuracy by which a carrier signal is restored by inserting a pilot signal.

Another object of the present invention is to provide a modulation/demodulation circuit for digital signal recorder/reproducer, for enhancing the accuracy by which a carrier signal is restored by suppressing information in the band around the carrier signal and selectively recording or transmitting the residual information.

These and other objects, features and advantages according to the present invention are accomplished by a modulation circuit for a digital signal recorder/reproducer for modulating the input coded multi-level digital signal having a first level, and recording or transmitting the modulated signal. The modulation circuit advantageously includes:

a mapper for separately generating in-phase (I) and quadrature phase (Q) channel data by simultaneously processing the coded multi-level digital signal in parallel to the degree required to generate a predetermined number of bits so that a large coding gain is obtained during a subsequent decoding operation;

first and second high-pass filters for removing respective direct current component from the I and the Q channel data output from the mapper, and for generating a respective multi-level digital signal having a second level which is larger than the first level;

first and second waveform shaping filters for waveform shaping and band limiting respective outputs of the first and the second high-pass filters;

a carrier signal generator for generating a carrier signal;

modulation means for performing quadrature amplitude and phase modulation on respective outputs of the first and the second waveform shaping filters using the carrier signal generated by the carrier signal generator; and pilot signal mixing means for generating a pilot signal and mixing the pilot signal with the output of the modulating means and outputting the result for selective recording or transmitting.

These and other objects, features and advantages according to the present invention are provided by a demodulation circuit for a digital signal recorder/reproducer for demodulating a modulated digital signal when a coded multi-level digital signal having a first level is modulated into a multi-level digital signal having a second level, then recorded or transmitted together with a pilot signal. The demodulator includes:

a carrier restoring circuit for restoring a carrier signal from the modulated digital signal using the pilot signal;

a demodulator for performing a quadrature amplitude and phase demodulation on the modulated digital signal using the restored carrier signal, to thereby generate I and Q channel data;

matched filters for performing an amplitude correction and a distortion compensation on the I and Q channel data output from the demodulator;

a first detector for detecting a multi-level signal having the second level from the I and Q channel data output from the matched filters;

a second detector for converting a multi-level signal having the second level output from the first detector into a multi-level digital signal having the first level; and a third detector for decoding the output of the second detector to thereby produce the original signal.

These and other objects, features and advantages of the invention are disclosed in or will be apparent from the following description of preferred embodiments.

BRIEF DESCRIPTION OF THE DRAWINGS

The preferred embodiments are described with reference to the drawings in which like elements are denoted by like or similar numbers and in which:

FIG. 1 shows the modulation system of the conventional digital signal recorder/reproducer;

FIG. 2 shows the demodulation system of the conventional digital signal recorder/reproducer;

FIG. 18A is a graph showing the arrangement of QAM signal outputs from the mapper shown in FIG. 14, while

FIG. 19 is a table showing the output of the high-pass filter shown in FIG. 14;

DETAILED DESCRIPTION OF THE PREFERRED EMBODIMENTS

An embodiment of modulation/demodulation circuits for a digital signal recorder/reproducer according to the present invention will now be explained with reference to the attached drawings.

Figure 14:
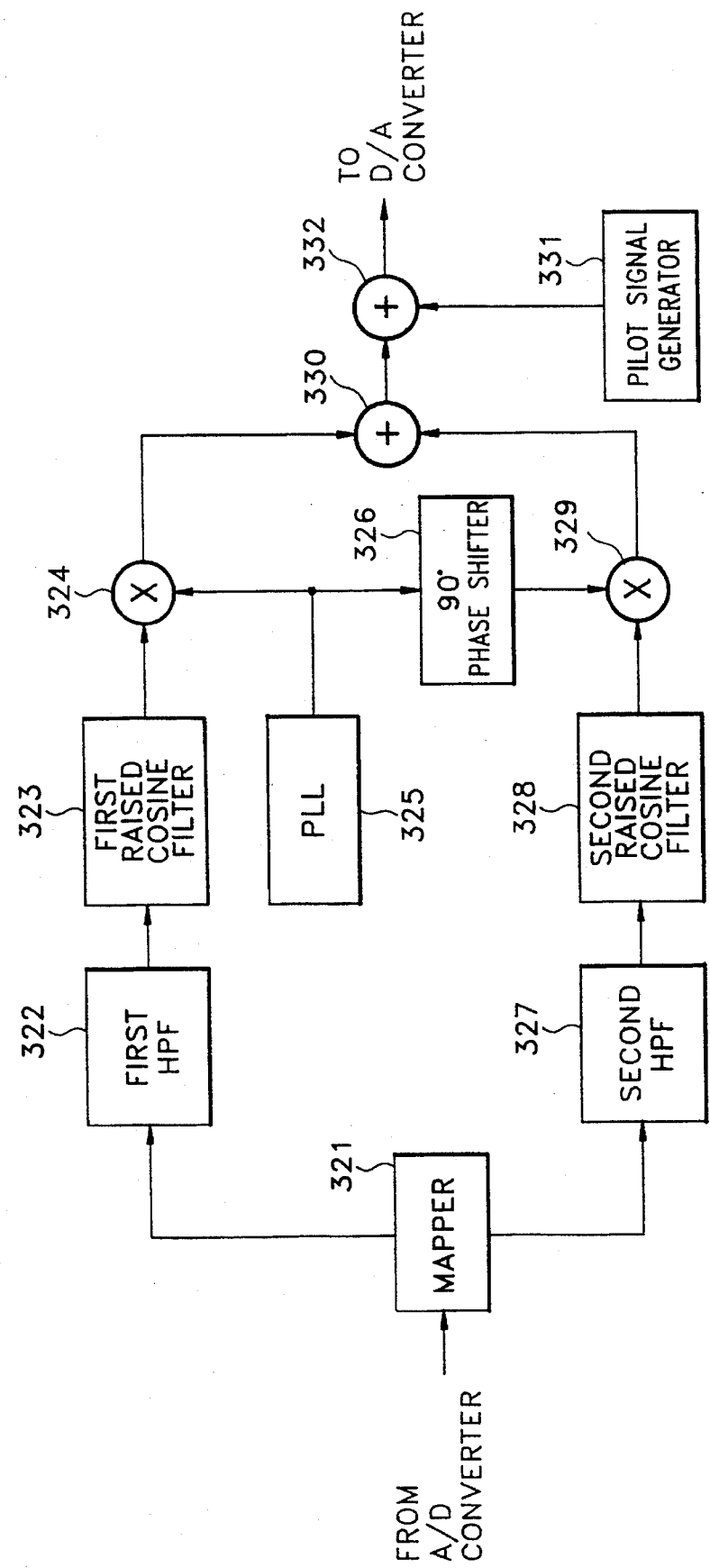
FIG. 14 is a high level block diagram showing an embodiment of a modulation circuit for a digital signal recorder/reproducer according to the present invention.

FIG. 14 is a high level block diagram showing an embodiment of modulation circuit for a digital signal recorder/reproducer according to the present invention, which includes a mapper 321 for separately generating I and Q channel data by simultaneously processing the input coded data bits in parallel to the degree required to generate a predetermined number of bits so that large coding gain is obtained during decoding. First and second high-pass filters 322 and 327 remove the direct current component of I and Q channel data output from mapper 321. Advantageously, first and second RCFs 323 and 328 perform waveform shaping and band limiting on the output of first and second high-pass filters 322 and 327. A PLL 325 preferably generates a clock signal corresponding to the frequency of carrier signal. A phase shifter 326 is also included for phase-shifting the output of PLL 325 by 90°. The modulator can include a first balanced modulator 324 for multiplying the output of first RCF 323 with the output of PLL 325 and for performing a balanced modulation on the result, and a second balanced modulator 329 for multiplying the output of second RCF 328 with the output of phase shifter 326 and for performing a balanced modulation on the result. Advantageously, the modulation circuit includes a first adder 330 for combining the outputs of first and second balanced modulators 324 and 329. A pilot signal generator 331 generating a pilot signal having the same frequency as that of carrier frequency, and a second adder 332 for adding the output of first adder 330 to the output of pilot signal generator 331, are also provided.

Figure 3:
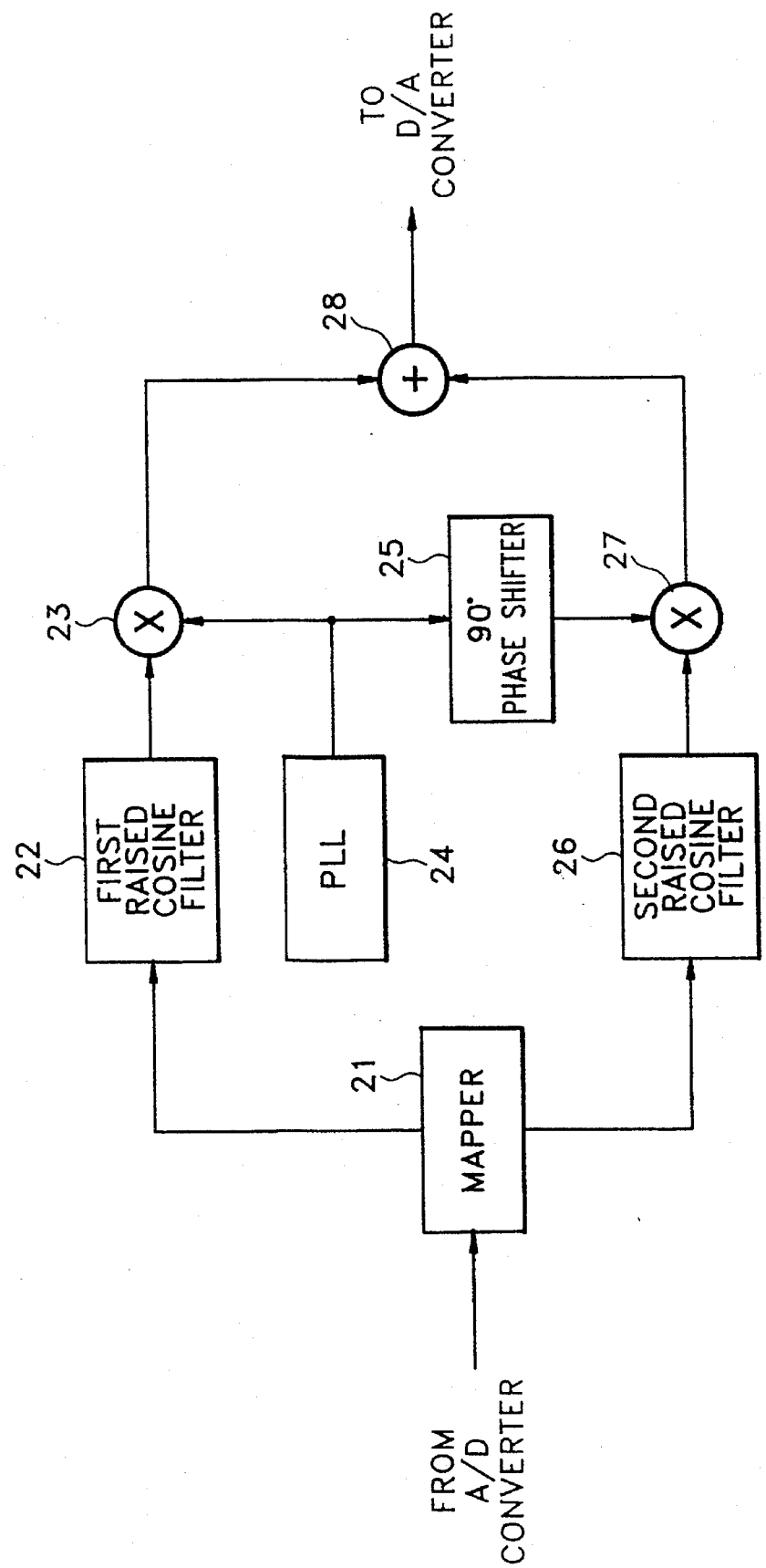
FIG. 3 is a circuit diagram of QAM modulation circuit shown in FIG. 1.
Figure 4:
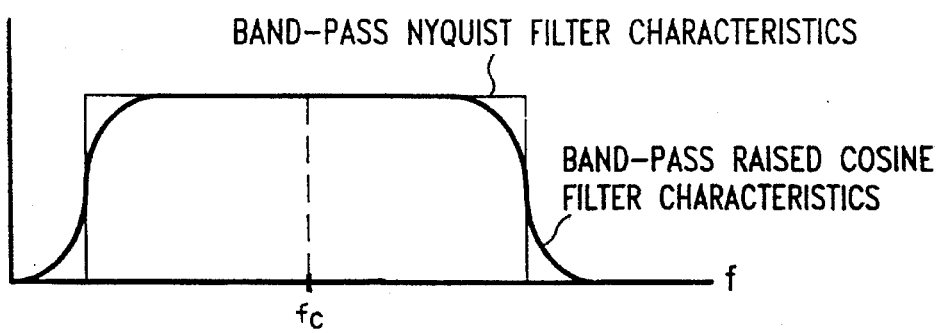
FIG. 4 is a graphical representation for illustrating the output frequency spectrum of QAM modulation circuit shown in FIG. 3.
Figure 5:
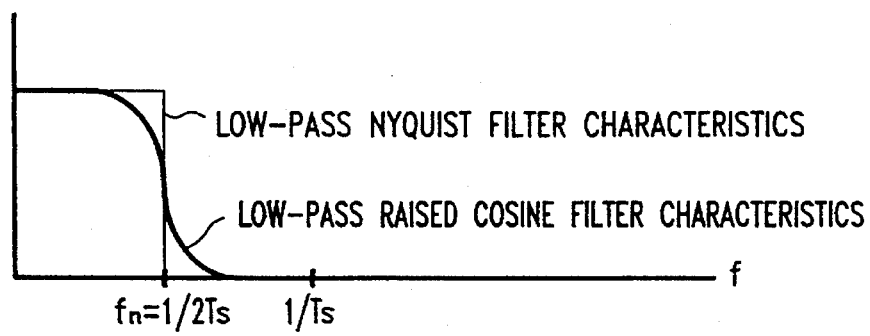
FIG. 5 is a graphical representation for illustrating the frequency characteristics of a raised cosine filter used for QAM modulation circuit and QAM demodulation circuit shown in FIGS. 1 and 2, respectively.
Figure 6:
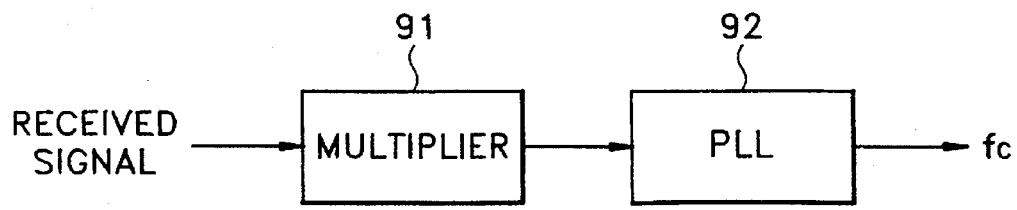
FIG. 6 is a block diagram of a carrier restoring circuit for restoring the carrier from 16 QAM signal which is produced using the by QAM modulation circuit shown in FIG. 3.
Figure 7:
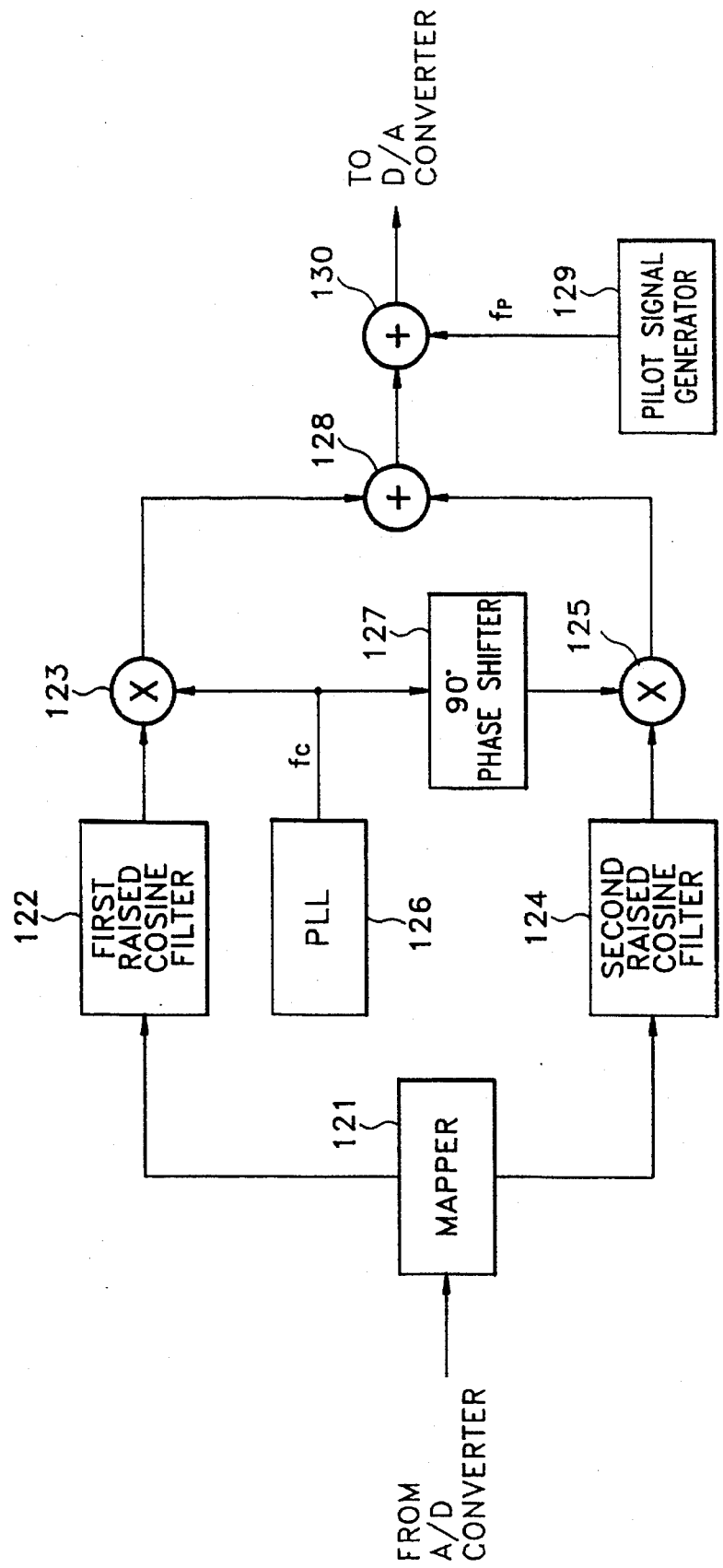
FIG. 7 is a circuit diagram showing a variation of the QAM modulation circuit shown in FIG. 1.
Figure 8:
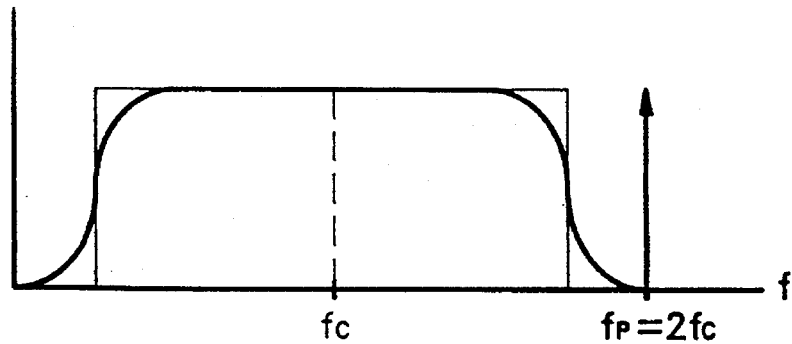
FIG. 8 is a graph illustrating the output frequency spectrum of the QAM modulation circuit shown in FIG. 7 when pilot frequency $f_p=2f_c$.
Figure 9:
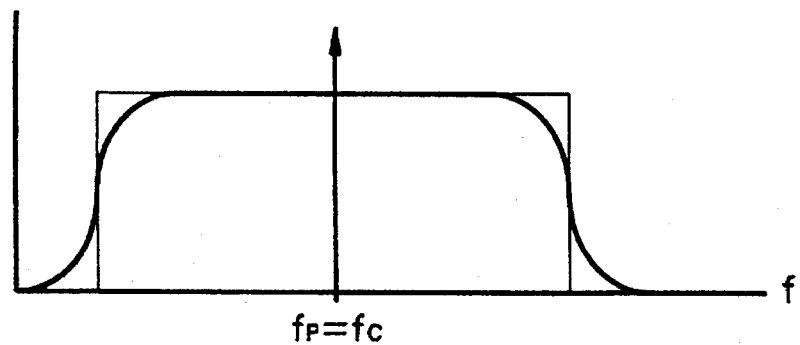
FIG. 9 is a graph illustrating the output frequency spectrum of the QAM modulation circuit shown in FIG. 7 when pilot frequency $f_p=f_c$.

Accordingly, by comparing the circuits of FIGS. 7 and 14, it will be appreciated that one characteristic of the present invention lies in that the component around the direct current is removed by inserting first and second HPFs 322 and 327 in front of first and second RCFs 323 and 328, and then the modulation is performed. It will be appreciated that this is markedly different from the QAM modulation circuit shown in FIG. 7.

The operation of modulation circuit for the digital signal recorder/reproducer shown in FIG. 14 will now be explained with reference to FIGS. 14 to 20.

Referring to FIG. 14, mapper 321 sets up relationship among signal points of the digital signal such that a large coding gain is obtained during decoding, and separately forms I and Q channel data, when the digital signal which has passed through an encoding process, for example, convolution encoding, is applied.

Figure 15:
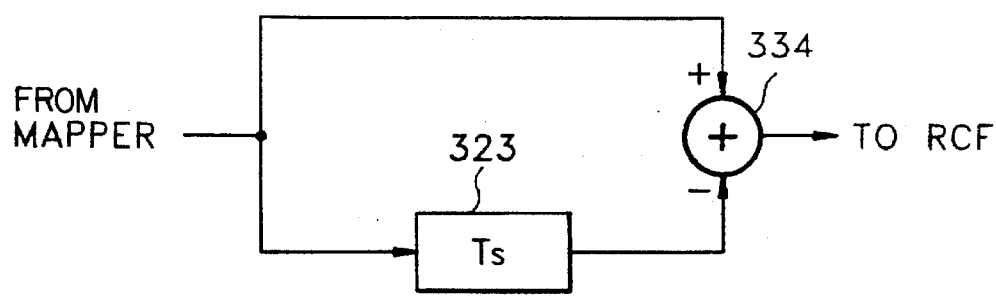
FIG. 15 is a circuit diagram illustrating one embodiment of the high-pass filter shown in FIG. 14.

In first and second high-pass filters 322 and 327, the component around the direct current among the data output from mapper 321 is removed. Advantageously, first and second high-pass filters 322 and 327 can be constructed as shown in FIG. 15. Preferably, when the signal, which is delayed by an amount corresponding to symbol interval (Ts) from the original signal, is added to the original signal, the frequency characteristics shown in FIG. 16A can be obtained.

In an exemplary case, the frequency response characteristic of the high-pass filter is as follows.

$$\begin{aligned}
h(t) &= \delta(t) - \delta(t-Ts) \\
H(jw) &= F^{-1}\{h(t)\} \\
&= 1 - e^{j2\pi fTs} \\
&= 2e^{-j2\pi fTs/2}(e^{-j2\pi fTs/2}/2 - e^{j2\pi fTs/2}/2) \\
&= 2e^{-j2\pi fTs/2}\sin(2\pi f \times Ts/2) \\
|H(jw)| &= 2\sin(\pi fTs) \quad (2) \\
\angle H(jw) &= \tan^{-1}(\sin 2\pi fTs/1 - \cos 2\pi fTs) \quad (3)
\end{aligned}$$

Figure 16A:
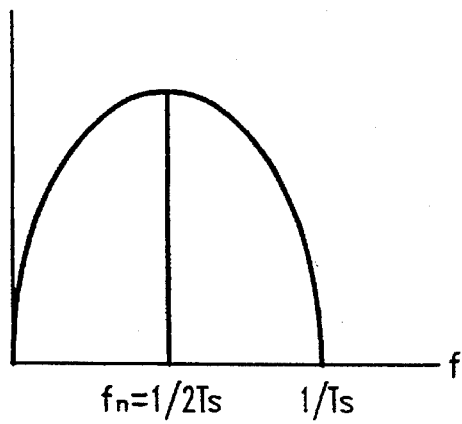
FIG. 16A is a graph illustrating the amplitude-frequency characteristic of the high-pass filter shown in FIG. 15.
Figure 16B:
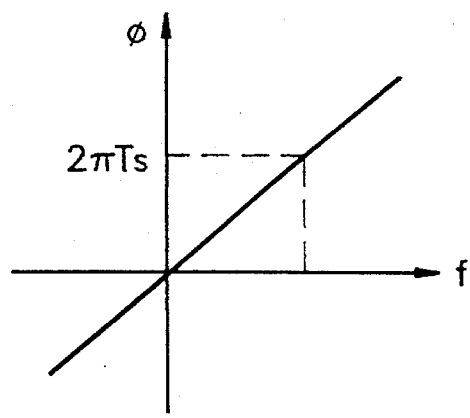
FIG. 16B is a graph illustrating the phase-frequency characteristic of the high-pass filter shown in FIG. 15.

In the above expression (2), if f equals ½Ts, the size is "2"; if f equals zero, the size is "0"; and if f equals 1/Ts, the size is "0." As a result of these relationships, the frequency characteristics of the high-pass filter is as shown in FIG. 16A. Phase characteristic is in proportion to frequency, as is shown in FIG. 16B.

Advantageously, a partial response system also can be used as another embodiment of the high-pass filter.

Figure 17:
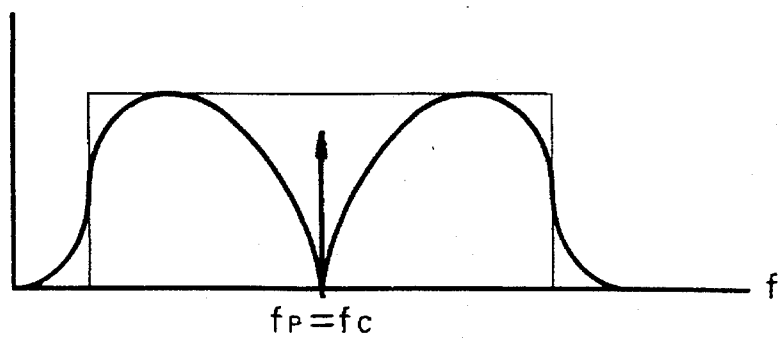
FIG. 17 is a graph showing the output frequency spectrum of the modulation circuit shown in FIG. 14.

Preferably, the frequency spectrum of the modulation circuit in FIG. 14 is as shown in FIG. 17. The information spectrum around the carrier frequency $f_c$ is considerably decreased and the signal to noise ratio is increased, with respect to the carrier signal. As a result, the carrier signal can be easily restored in a corresponding demodulation circuit. Advantageously, communication is possible even though the small amount of carrier signal power is transmitted from the modulation circuit. As a result, a power efficiency is notably enhanced. It will be appreciated that this can produce a great effect in equipment requiring a high power efficiency.

Figure 10:
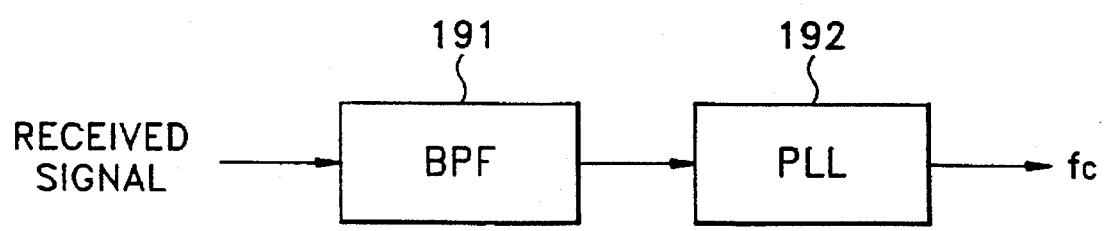
FIG. 10 is a block diagram of a carrier restoring circuit for restoring a carrier signal from the signal produced by the QAM modulation circuit shown in FIG. 7.
Figure 11:
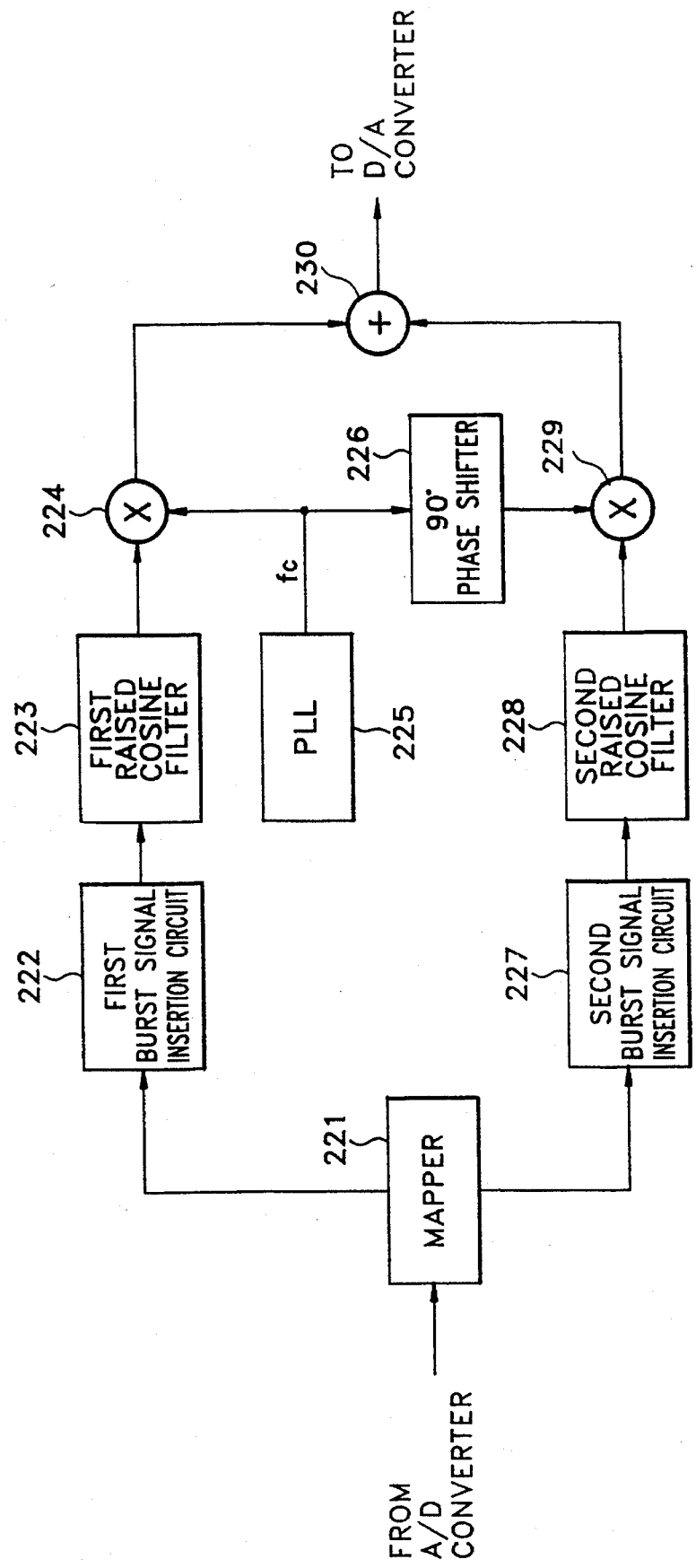
FIG. 11 is a circuit diagram showing still another variation of QAM modulation circuit shown in FIG. 1.
Figure 12:
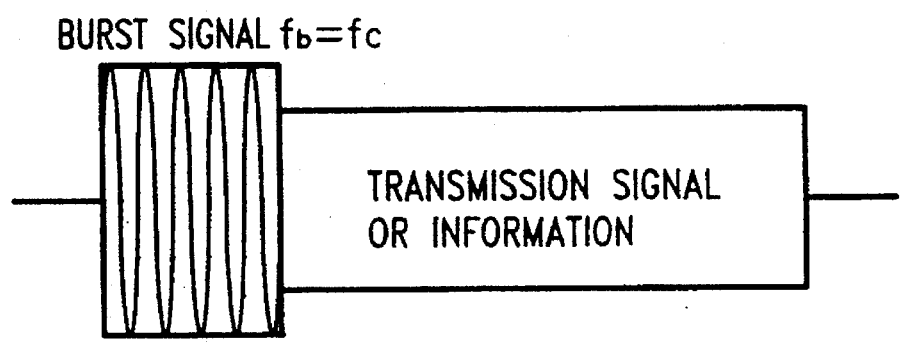
FIG. 12 is a waveform diagram of the output of QAM modulation circuit shown in FIG. 11 with respect to the time axis.
Figure 13:
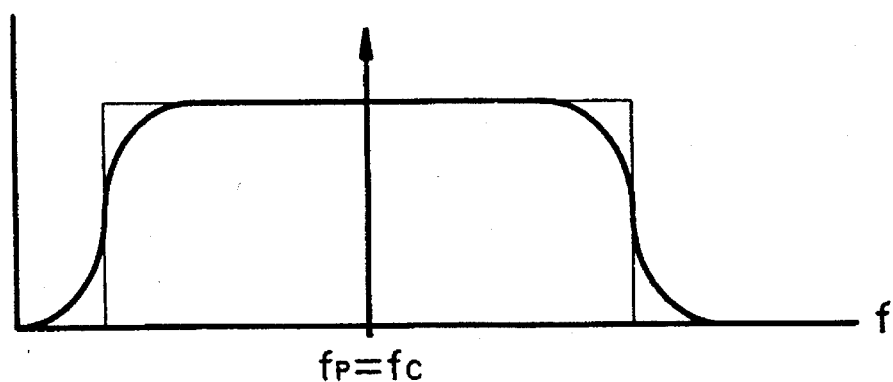
FIG. 13 is a graph showing the output frequency spectrum of the QAM modulation circuit shown in FIG. 11.

Since many problems described above are solved by the carrier restoring circuit, the carrier restoring circuit shown in FIG. 10 can be used as it is. Preferably, pilot frequency $f_p$ which is the same as carrier frequency $f_c$ is used.

Figure 18B:
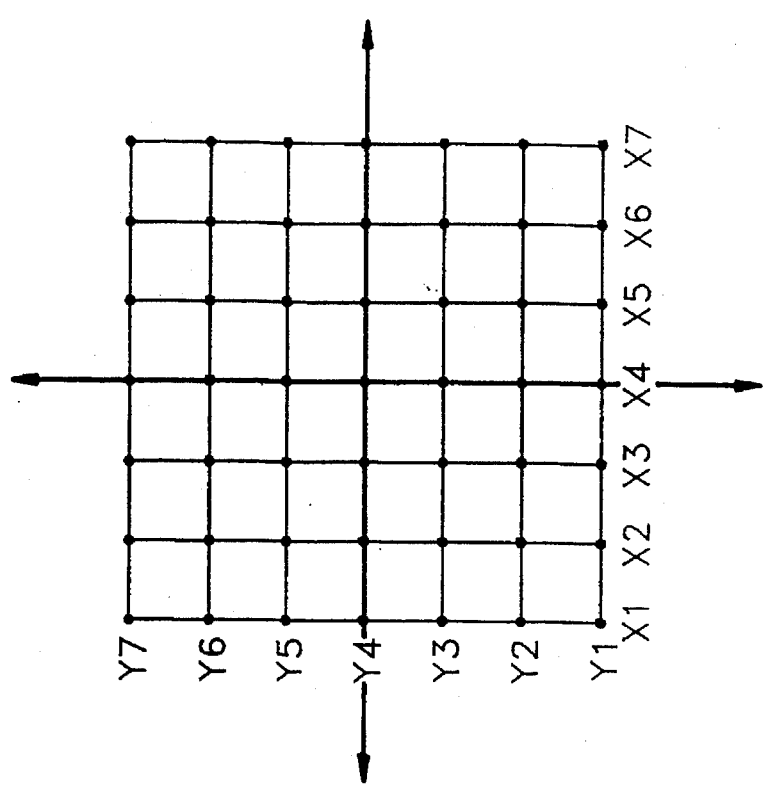
FIG. 18B is a graph showing the arrangement of QAM signal output from the high-pass filter shown in FIG. 14.
Figure 18A:
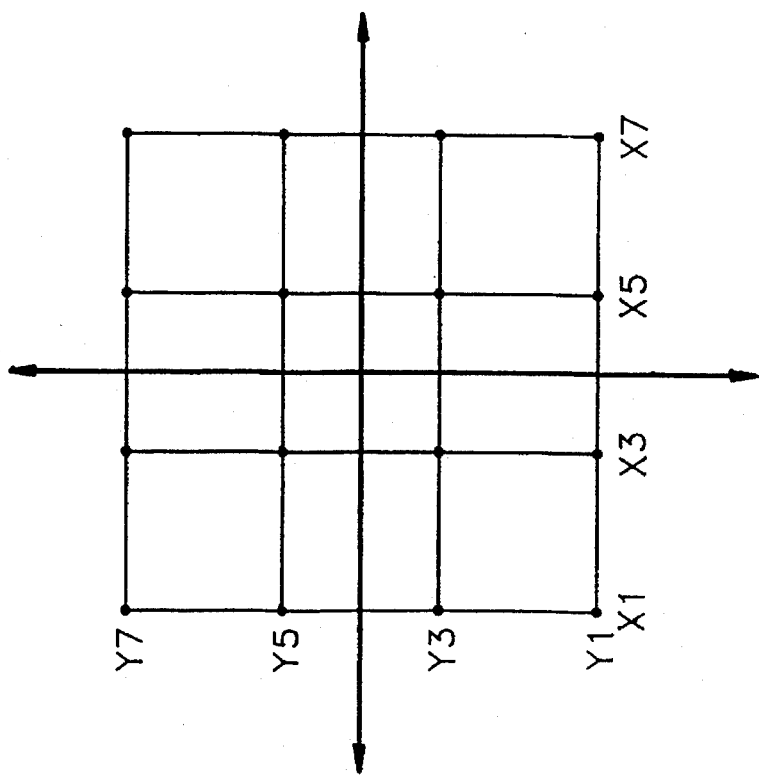
Figure 20:
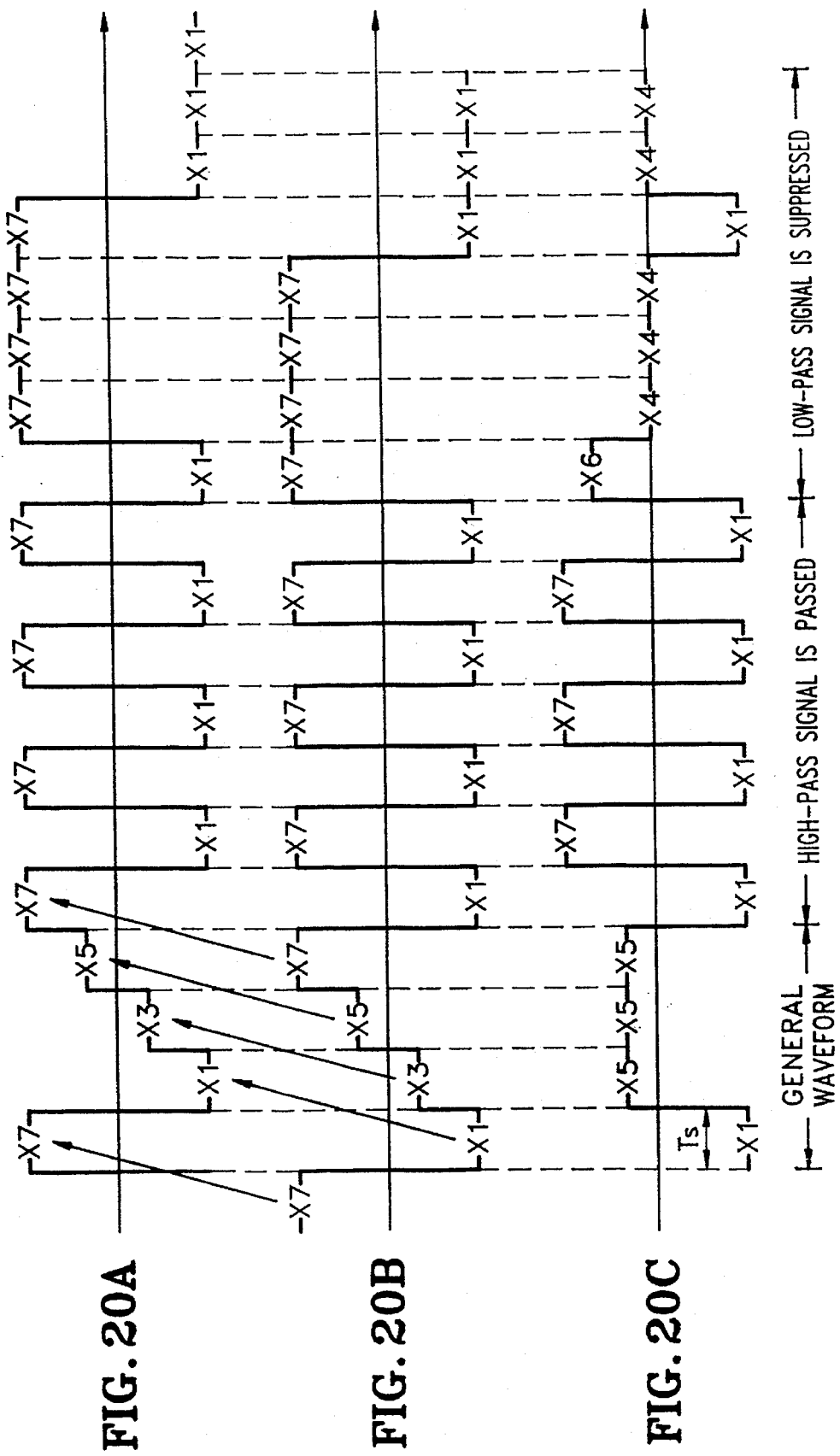
FIG. 20A is a waveform diagram showing the input signal delayed in the delay shown in FIG. 15 by an amount equal to symbol interval (Ts)
FIG. 20B is a waveform diagram showing the one input signal of the subtracter shown in FIG. 15.
FIG. 20C is a waveform diagram showing the output signal passed through the subtracter shown in FIG. 15.

FIG. 18A shows an arrangement of QAM signal which has passed through mapper 321 of FIG. 14. When the QAM signal passes through first and second high-pass filter 322 and 327, the arrangement shown in FIG. 18B is obtained. That is, an input 4-levels signal is convened into a 7-levels signal.

FIG. 19 shows the output table of first and second high-pass filters, 322 and 327 employed in FIG. 14. If the coded multiple valued digital signals are divided into 4-levels, i.e., X1, X3, X5 and X7, the values passed through the high-pass filter are divided into 7-levels, i.e., X1 to X7.

FIG. 20A shows an output signal delayed by an amount corresponding to the symbol interval (Ts) characteristic of delay 333 of the high-pass filter shown in FIG. 15. FIG. 20B shows an example of the input signal of the first and second high-pass filters 322 and 327 shown in FIG. 15, and FIG. 20C shows an output signal of subtracter 334, i.e., the signal output by the high-pass filter shown in FIG. 15. Preferably, among the input signals of the high-pass filter shown in FIG. 20B, the high-pass signal of the middle portion passes without being damaged, whereas the low-pass signal is suppressed, as is shown in the output signal of high-pass filter shown in FIG. 20C FIG. 21 is a circuit diagram showing an embodiment of the demodulation circuit for a digital signal recorder/reproducer according to the present invention.

A demodulation circuit of the present invention includes a carrier restoring circuit 391 for restoring a carrier signal from the input modulated signal and third and fourth balanced modulators 392 and 397 for performing balanced modulation on the carrier signal of carrier restoring circuit 391 and on the input modulated signal thereby demodulating I and Q channel data. Third and fourth RCFs 393 and 398 are provided for performing amplitude and phase corrections on the outputs of third and fourth balanced modulators 392 and 397. Preferably, first and second detectors 394 and 399, consisting of sample and hold circuits, can be provided for performing integration on the outputs of third and fourth RCFs 393 and 398 and, thus, demodulating the signal modulated into a 7-values signal. Advantageously, a symbol interval restoring circuit 395 is included for generating a sample and hold control signal from the output of first and second detectors 394 and 399 and subsequently providing the sample and hold control signal to first and second detectors 394 and 399. Third and fourth detectors 396 and 400 are provided for converting the 7-levels signals output from first and second detectors 394 and 399 into 4-levels signals, and a fifth detector 401, consisting of a Viterbi decoder is provided for decoding the 4-levels signals output from third and fourth detectors 396 and 400 into the original signal.

Figure 21:
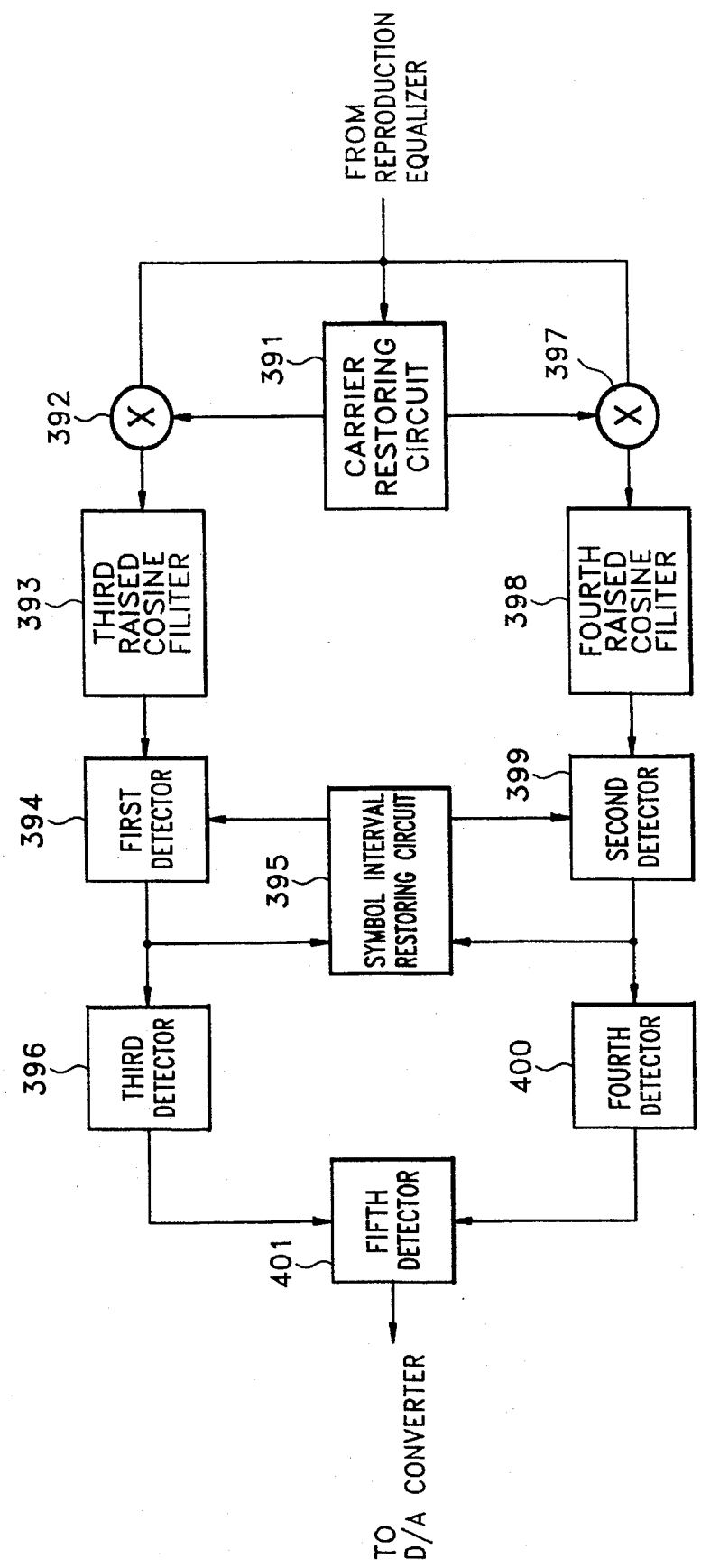
FIG. 21 is a high level block diagram showing an embodiment of the demodulation circuit for a digital signal recorder/reproducer according to the present invention.

In the carrier restoring circuit 391 of FIG. 21, the band corresponding to a pilot signal in the input modulated digital signal, which is selectively transmitted or reproduced, is filtered, and then the carrier signal is restored. It will be appreciated that the carrier restoring circuit can be substantially similar to that employed in FIG. 10.

In third and fourth balanced modulators 392 and 397, the input modulated digital signal is quadrature amplitude and phase demodulated into I and Q channel data using the carrier signal recovered by carrier restoring circuit 391. In third and fourth RCFs 393 and 398, the amplitudes and the phases of the demodulated outputs of third and fourth balanced modulators 392 and 397 are corrected as needed.

In first and second detectors 394 and 399, the received 7-levels signals, i.e., the outputs of third and fourth RCFs 393 and 398, are detected and output to third and fourth detectors 396 and 400 and to symbol interval restoring circuit 395.

In symbol interval restoring circuit 395, a sample and hold control signal is feedback from the outputs of first and second detectors 394 and 399 to first and second detectors 394 and 399, by time intervals corresponding to symbol interval (Ts).

Third and fourth detectors 396 and 400 advantageously can be constructed with high-pass filters, respectively, in which the 7-levels signal input is restored to the 4-levels signal, i.e., the original level, according to the flowchart of FIG. 22, which is discussed in detail below. Preferably, fifth detector 401 is a multiple value detector for receiving the outputs of third and fourth detectors 396 and 400 and for outputting the source data. In an exemplary case, a Viterbi decoder can be used as the fifth detector 401. It will be appreciated that the Viterbi decoder selects the path whose hamming distance to the received data stream is shortest and performs a decoding, according to a maximum likelihood decoding (MLD) method.

Operation of the demodulation circuit shown in FIG. 21 will now be explained with reference to the flowchart of FIG. 22, which is a flowchart for explaining the conversion of the 7-levels signal detected in first and second detectors 394 and 399 shown in FIG. 21 into the 4-levels signal.

Figure 22:
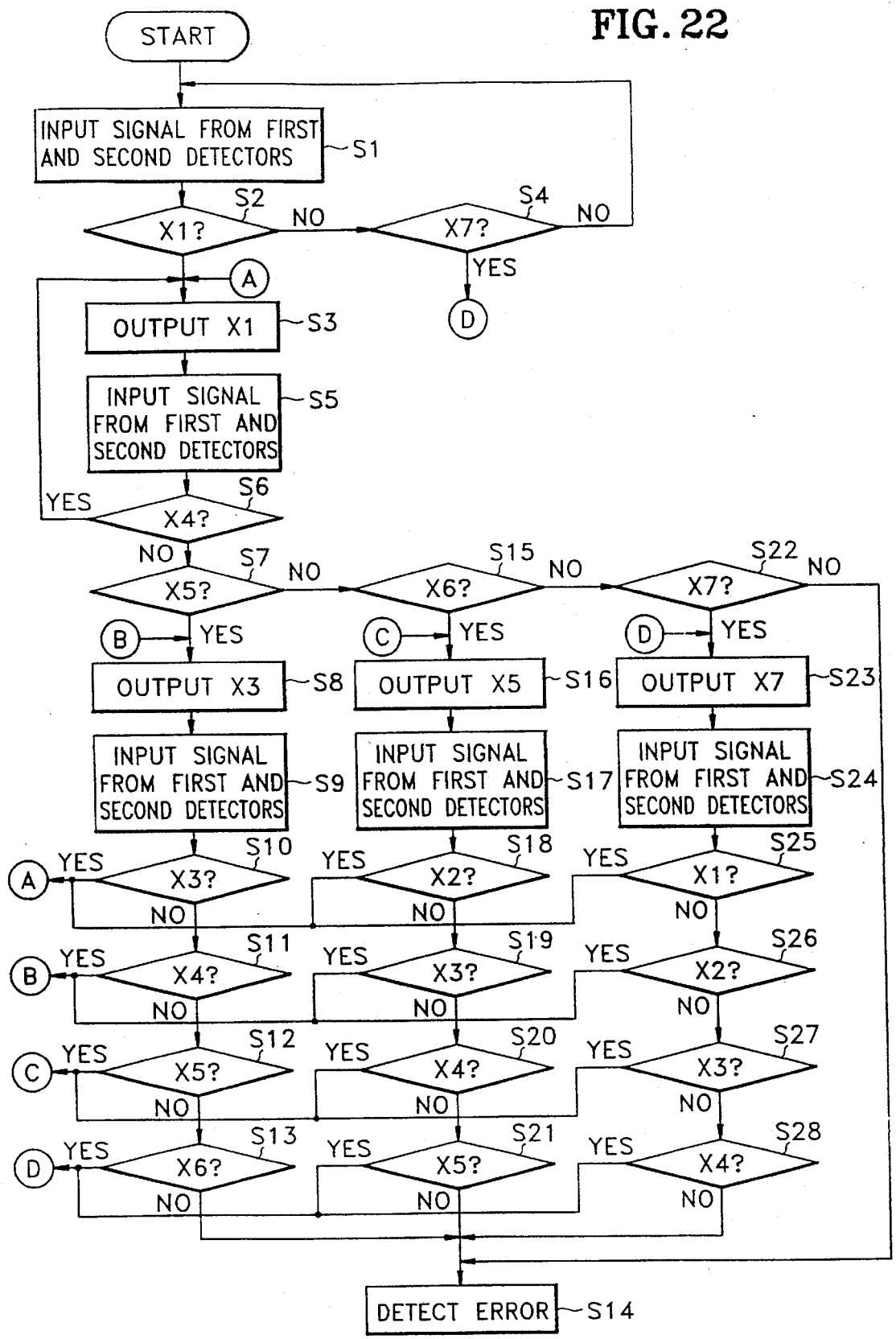
FIG. 22 is a flowchart which is useful in explaining the steps by which the 7-values signal detected in first and second detectors shown in FIG. 21 is converted into the 4-values signal.

Referring to FIG. 22, the 7-levels digital signal detected by first and second detectors 394 and 399 is first input during step S1. A check is then performed to determine if the 7-levels digital signal is X1 or not during step S2. If X1 is detected, X1 is output during step S3: if not, an additional check is made to determine if the 7-levels digital signal is X7 at step S4. If the 7-levels digital signal is X7, the program steps to step 23 and X7 is output. If the 7-levels digital signal is not X7, program control follows feedback loop back to step S1.

After X1 is output in step S3, the 7-levels digital signal is input from first and second detectors 394 and 399 during step S5. A check is then made to determine whether the input signal is X4 or not during step S6. If the input signal, i.e., the input 7-levels digital signal, is X4, step S3 is repeated to thereby output the value X1. If the input signal is not X4, a next check is made to determine if the input signal is X5 or not during step S7. If the input signal is X5, X3 is output at step S8.

Again, the 7-levels digital signal is input from first and second detectors 394 and 399 during step S9. Afterwards, a check is performed to determine if the input signal is X3 or not. If the input signal is X3 during step S10, step S3 is performed to output X1. If the input signal is not X3, a further check is performed to determine if it is X4 or not during step S11.

If the input signal is X4 in step S11, X3 is output in step S8. However, if the input signal is not X4, a subsequent test is performed to determine if it is X5 or not. If the input signal is X5 during step S12, step S16 is performed to output X5. If the input signal is not X5, a still further check is performed to determine if the input signal is X6 or not during step S13. If X6 is identified, step S23 is performed to thereby output X7. If the input signal is not X6, an error is detected at step S14.

During step S7 for determining if the input signal is X5 or not, if it determined that the input signal is not X5, a check is performed to determine if the input signal is X6 or not during step S15. If the input signal is X6 during step S15, X5 is output at step S16. Thereafter, the input signal, i.e., the 7-levels digital signal, is input from first and second detectors 394 and 399 during step S17. A check is then made to determine if the input signal is X2 or not during step S18. If the input signal is X2, X1 is output by performance of step S3; if it is not, a further check is performed during step S19 to determine if the input signal is X3 or not.

If the input signal is X3 in step S19, step S8 is performed to output X3. If the input signal is not X3, a further check is performed to determine whether it is X4 or not. If the input signal is X4 during step S20, step S16 is performed to thereby output X5. However, if the input signal is not X4, another check is made to determine whether the input signal is X5 or not during step S21.

In step S21, if the input signal is X5, step S23 is performed to thereby output X7. If the input signal is not X5, an error is detected at step S14.

During step S15, if it is determined that the input signal is not X6, a check is performed to determine if the input signal is X7 or not during step S22. If the input signal is X7, X7 is output during performance of step S23. If the input signal is not X7 at step S22, an error is detected at step S14.

Preferably, the 7-levels digital signal is input from first and second detectors 394 and 399 during step S24, and a check is performed to determine if the input signal is X1 or not. If the input signal is X1 during step S25, step S3 is performed to output X1. If the input signal is not X1 during step S25, a ensuing check is performed to determine if the input signal is X2 or not during step S26.

In step S26, if the signal is X2, step S8 is performed to thereby output X3. If the input signal is not X2, an additional check is performed to determine whether the input signal is X3 or not. When the answer at step S27 is affirmative, step S16 is executed to output X5. During step S27, if the input signal is not X3, a follow-on check is made to determine whether the input signal is X4 or not during step S28. If the input signal is X4, step S23 is performed to output X7. If the input signal is not X4, an error is detected in step S28 and signalled in step S14.

As described above, in modulation/demodulation circuits for digital signal recording and reproducing apparatus according to the present invention, a pilot signal is inserted for restoring a carrier signal. The accuracy of the carrier restoration and the power efficiency are enhanced using the high-pass filter for suppressing the band where the carrier signal is loaded.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. A modulation circuit for a digital signal recorder/reproducer for modulating an input coded first multi-level digital signal having a first magnitude to thereby selectively record or transmit a modulated digital signal, said modulation circuit comprising:

a mapper for separately outputting in-phase (I) and quadrature phase (Q) channel data by simultaneously processing said first multi-level digital signal in parallel to a degree required to permit generation of a predetermined number of bits so that a large coding gain is obtained during a subsequent decoding operation;

first and second high-pass filters for removing respective direct current components from said I and said Q channel data output from said mapper;

first and second waveform shaping filters for performing waveform shaping and band limiting on respective outputs of said first and second high-pass filters;

carrier signal generator generating a carrier signal;

modulation means for performing a quadrature amplitude and phase modulation on respective outputs of said first and said second waveform shaping filters using said carrier signal generated by said carrier signal generator; and pilot signal mixing means for generating a pilot signal, and for mixing said pilot signal with the output of said modulation means to thereby generate the modulated digital signal.

2. The modulation circuit for a digital signal recorder/reproducer according to claim 1, wherein pilot signal frequency is equal to carrier signal frequency.

3. The modulation circuit for a digital signal recorder/reproducer according to claim 1, wherein said first and said second high-pass filters suppress a band portion wherein the carrier signal is loaded and simultaneously output a second multi-level digital signal having a second magnitude larger than that of said first magnitude produced by said mapper.

4. The modulation circuit for a digital signal recorder/reproducer according to claim 3, wherein said first and said second high-pass filters each comprise:

a delay for delaying one of said (I) and said (Q) channel data output from said mapper by an amount corresponding to a symbol interval to thereby produce delayed channel data; and a first adder for adding said delayed channel data to said one of said I and Q channel data.

5. The modulation circuit for digital signal recorder/reproducer according to claim 3, wherein said first and said second high-pass filters convert a 4-levels signal having said first magnitude into a 7-levels signal having said second magnitude.

6. The modulation circuit for a digital signal recorder/reproducer according to claim 1, wherein said modulation means comprises:

first and second balanced modulators for performing respective quadrature amplitude and phase modulation on respective outputs of said first and said second waveform shaping filters using said carrier signal; and an adder for summing respective outputs of said first and said second balanced modulators.

7. The modulation circuit for a digital signal recorder/reproducer according to claim 6, wherein said pilot signal mixing means comprises:

a pilot signal generator generating said pilot signal, wherein a pilot signal frequency is equal to a carrier signal frequency; and another adder for adding respective outputs of said adder and said pilot signal generator, to thereby output said modulated digital signal.

8. A demodulation circuit for a digital signal recorder/reproducer for demodulating a modulated digital signal, characterized in that a coded first multi-level digital signal having a first magnitude is modulated into a second multi-level digital signal having a second magnitude, before being one of recorded and transmitted together with a pilot signal, to thereby recover an original signal, said circuit comprising:

carrier restoring means for restoring a carrier signal from said modulated digital signal using said pilot signal;

demodulating means for performing quadrature amplitude and phase demodulation on said modulated digital signal using said restored carrier signal, to thereby output in-phase (I) and quadrature (Q) channel data;

matched filtering means for performing amplitude correction and distortion compensation on said I and said Q channel data output from said demodulating means;

first detecting means for detecting said second multi-level signal having said second magnitude from respective said I and said Q channel data output from said matched filtering means;

second detecting means for converting said second multi-level signal output from said first detecting means into said first multi-level digital signal having said first magnitude; and third detecting means for decoding said first multilevel digital signal to thereby regenerate the original signal.

9. The demodulation circuit for a digital signal recorder/reproducer according to claim 8, wherein said first detecting means comprises:

a symbol interval restoring circuit generating a sample and hold control signal corresponding to a symbol interval; and a plurality of sample and hold circuits for detecting said second multi-level digital signal among the I and the Q channel data, responsive to said sample and hold control signal, output to said second detecting means and, simultaneously, to said symbol interval restoring circuit.

10. The demodulation circuit for a digital signal recorder/reproducer according to claim 8, wherein said second detecting means includes high-pass filters.

11. The demodulation circuit for a digital signal recorder/reproducer according to claim 10, wherein said first multi-level signal is a 4-levels signal, wherein said second multi-level signal is a 7-levels signal, and wherein said second detecting means converts said 7-levels signal having said second magnitude into said 4-levels signal having said first magnitude.

12. The demodulation circuit for a digital signal recorder/reproducer according to claim 8, wherein said third detecting means includes a Viterbi decoder.

13. Modulation/demodulation circuits for a digital signal recorder/reproducer for converting an input digital signal into a coded first multi-level digital signal having a first magnitude and for modulating and demodulating the first multi-level digital signal, comprising:

a mapper for separately outputting in-phase (I) and quadrature phase (Q) channel data by simultaneously processing said first multi-level digital signal in parallel to a degree required to generate a predetermined number of bits so as to permit a large coding gain to be obtained during a decoding operation;

first and second high-pass filters for removing respective direct current components from the I and the Q channel data output by said mapper, and for converting respective outputs into a second multi-level digital signal having a second magnitude which is greater than said first magnitude;

carrier signal generator generating a carrier signal;

modulation means for performing quadrature amplitude and phase modulations on respective outputs of said first and said second high-pass filters using said carrier signal;

pilot signal mixing means generating a pilot signal for mixing said pilot signal with a respective output of said modulation means to thereby output a resultant signal;

carrier restoring means for restoring the carrier signal from said resultant signal using said pilot signal;

demodulating means for performing quadrature amplitude and phase demodulations on said resultant signal using said restored carrier signal, to thereby output respective said I and said Q channel data;

first detecting means for detecting said second multi-level signal having said second magnitude from said I and said Q channel data output from said demodulation means;

second detecting means for converting said second multi-level signal having said second magnitude into respective said first multi-level digital signal having said first magnitude; and third detecting means for decoding said first multi-level signal to thereby regenerate said input digital signal.

14. Modulation/demodulation circuits for a digital signal recorder/reproducer according to claim 13, further comprising:

first and second waveform shaping filters performing waveform shaping and band limiting on respective outputs of said first and said second high-pass filters; and first and second matched filters for performing amplitude correction and distortion compensation on respective said I and said Q channel data output from said demodulation means.

15. Modulation/demodulation circuits for a digital signal recorder/reproducer according to claim 13, wherein said third detecting means comprises a Viterbi decoder.

* * * * *